(12) United States Patent
Kripac et al.

(10) Patent No.: US 8,525,838 B2
(45) Date of Patent: Sep. 3, 2013

(54) ASSOCIATIVE FILLET

(75) Inventors: Jiri Kripac, Mill Valley, CA (US); John G. Ford, III, Fairfax, CA (US)

(73) Assignee: Autodesk, Inc., San Rafael, CA (US)

( * ) Notice: Subject to any disclaimer, the term of this patent is extended or adjusted under 35 U.S.C. 154(b) by 1131 days.

(21) Appl. No.: 12/028,700

(22) Filed: Feb. 8, 2008

(65) Prior Publication Data

US 2009/0201295 A1 Aug. 13, 2009

(51) Int. Cl.
*G06T 11/20* (2006.01)

(52) U.S. Cl.
USPC ........................................................ 345/442

(58) Field of Classification Search
USPC ........................................................ 345/442
See application file for complete search history.

(56) References Cited

U.S. PATENT DOCUMENTS

| | | | |
|---|---|---|---|
| 4,821,214 A | | 4/1989 | Sederberg |
| 5,390,294 A | * | 2/1995 | Takeuchi ............... 345/441 |
| 5,396,590 A | | 3/1995 | Kreegar |
| 5,644,654 A | * | 7/1997 | Onokera ............... 382/199 |
| 5,815,154 A | | 9/1998 | Hirschtick et al. |
| 5,859,786 A | | 1/1999 | Klein |
| 5,990,897 A | | 11/1999 | Hanratty |
| 5,999,186 A | * | 12/1999 | Jackson ............... 345/420 |
| 6,308,144 B1 | | 10/2001 | Bronfeld et al. |
| 6,377,281 B1 | * | 4/2002 | Rosenbluth et al. ...... 715/700 |
| 6,392,645 B1 | | 5/2002 | Han et al. |
| 6,525,745 B1 | * | 2/2003 | Phelan et al. ............ 345/676 |
| 6,628,279 B1 | | 9/2003 | Schell et al. |
| 6,751,581 B1 | * | 6/2004 | Ondrus et al. ............ 703/6 |
| 6,867,771 B2 | | 3/2005 | Kripac |
| 7,092,859 B2 | | 8/2006 | Wang et al. |
| 7,668,700 B2 | * | 2/2010 | Erignac et al. ............ 703/1 |
| 2002/0051000 A1 | * | 5/2002 | Anami et al. ............ 345/582 |
| 2002/0138238 A1 | * | 9/2002 | Kubota et al. ............ 703/1 |
| 2003/0067487 A1 | | 4/2003 | Kohls et al. |
| 2003/0214503 A1 | | 11/2003 | Venkataraman et al. |
| 2008/0049046 A1 | * | 2/2008 | Bae et al. ............ 345/689 |

FOREIGN PATENT DOCUMENTS

| | | |
|---|---|---|
| WO | 95/11482 | 4/1995 |
| WO | 01/55831 | 8/2001 |

OTHER PUBLICATIONS

Convard et al., "History based reactive objects for immersive CAD," Proceedings of the Ninth ACM Symposium on Solid Modeling and Applications, Jun. 9-11, 2004, ACM Symposium on Solid and Physical Modeling, Eurographics Association, pp. 291-296.

Butterworth et al., "3DM: A three dimensional modeler using a head-mounted display," Proceedings of the 1992 Symposium on Interactive 3D Graphics, SI3D '92, ACM, New York, NY pp. 135-138 and 226.

Cignoni et al., "Simplification of tetrahedral meshes with accurate error evaluation," Proceedings of the Conference of Visualization '00, Oct. 2000, pp. 85-93.

(Continued)

*Primary Examiner* — Jeffrey Chow
(74) *Attorney, Agent, or Firm* — Gates & Cooper LLP

(57) ABSTRACT

A method, apparatus, and article of manufacture provide the ability to update a filleted curve in a computer graphics application. A drawing having a first input curve and a second input curve is displayed. The first and second input curves are selected. A fillet curve is calculated, created, and displayed between the two input curves. A property of the first input curve is modified. Automatically, without additional user input, the fillet curve is recalculated based on the modified property. The recalculated fillet curve is displayed.

20 Claims, 7 Drawing Sheets

(56) References Cited

OTHER PUBLICATIONS

Kripac, "A mechanism for persistently naming topological entities in history-based parametric solid models," Proceedings of the Third ACM Symposium on Solid Modeling and Applications, May 17-19, 1995, C. Hoffmann and J. Rossignac, Eds., SMA '95, ACM, New York, NY, pp. 21-30.

Raghothama et al., "Necessary conditions for boundary representation variance," Proceedings of the Thirteenth Annual Symposium on Computational Geometry, Jun. 4-6, 1997, Nice, France, pp. 77-86.

Raghothama et al., "Boundary representation deformation in parametric solid modeling," ACM Transactions on Graphics (TOG), vol. 17, No. 4, Oct. 1998, pp. 259-286.

Rappaport, "Breps as displayable-selectable models in interactive design in families of geometric objects," Institute of Computer Science, The Hebrew University, Jerusalem 91904, Israel, http://www.cs.huji.ac/il/_arir.arir@cs.huji.ac.il.

* cited by examiner

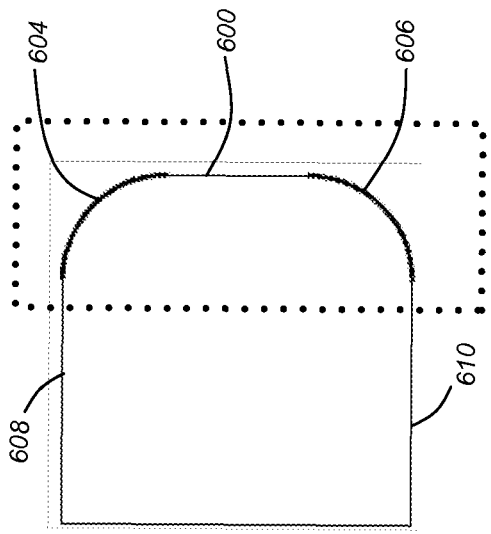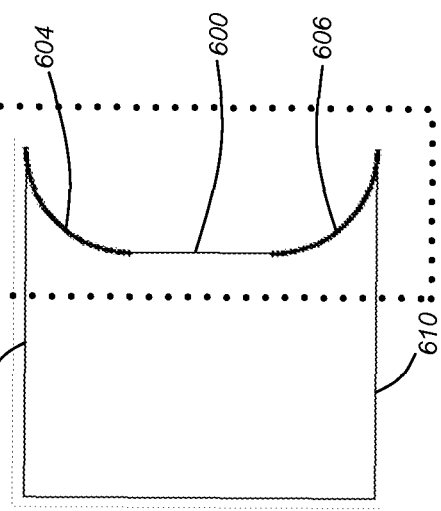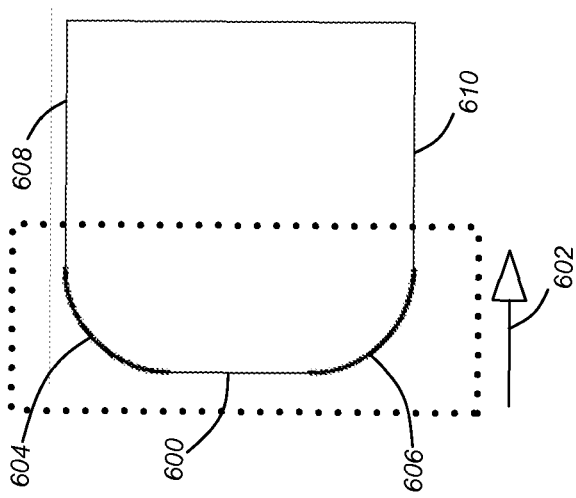

ASSOCIATIVE FILLET

CROSS-REFERENCE TO RELATED APPLICATIONS

This application is related to the following co-pending and commonly-assigned patent(s) and patent application(s), which patents and applications are incorporated by reference herein:

U.S. Pat. No. 6,867,771, issued on Mar. 15, 2005, and filed on May 7, 2002, entitled "CONTROLLED FACE DRAGGING IN SOLID MODELS", by Jiri Kripac;

U.S. patent application Ser. No. 10/132,544, filed on Apr. 25, 2002, entitled "FACE MODIFICATION TOOL", by Sha Wang, William L. Myers, and John R. Wallace; and U.S. patent application Ser. No. 11/376,654, filed on Mar. 15, 2006, entitled "CONTROLLED TOPOLOGY TWEAKING IN SOLID MODELS", by Jiri Kripac.

BACKGROUND OF THE INVENTION

1. Field of the Invention

The present invention relates generally to two-dimensional and three-dimensional computer-aided design (CAD) drafting systems, and in particular, to a method, apparatus, and article of manufacture for the creation and use of an associative fillet in a 2D or 3D CAD system.

2. Description of the Related Art

The use of computer-aided design (CAD) application programs is well known in the art. CAD application programs are often used to design, develop, and optimize a two-dimensional (2D) or three-dimensional (3D) representation of a product, tools and machinery used in the manufacture of components, and/or in the drafting and design of buildings. When two geometric objects/entities are joined together in a CAD application, there often is need to round the sharp corner at the joint, and/or to make a smooth transition between the two geometric entities to maintain tangency continuity (G1 continuity). Such transitional shapes that represent smooth transitions between two or more geometric entities are called fillets or blends. Fillets in 2D drafting systems are often represented by circular arcs, but they can be arbitrary curves.

Fillets in prior art CAD application programs are independent entities and are not directly associated with the two entities. Accordingly, in the design process, if either one of the two entities is edited, the already created fillet needs to be manually erased and recreated. Such problems may be better understood with an explanation of the use and creation of fillets in the prior art.

FIG. 1A illustrates a fillet created in accordance with the prior art. Most CAD applications (and 2D drafting systems), including AutoCAD™ (available from the assignee of the present invention), contain a tool that creates a fillet 100A between two selected curves 102 and 104 by adding a circular arc (or, in a general case, an arbitrary blending curve) tangent to the two curves 102 and 104 and extending or trimming the curves 102 and 104 to the endpoints of the new arc 100A. The fillet arc 100A is an independent entity not associated with the curves 102 and 104. When the curves 102 and 104 are edited, the already created fillet arc 100A needs to be manually erased and recreated. The creation and editing process is as follows:

(1) (a) Use a "FILLET" command;
(b) Select two existing curves 102 and 104;
(c) Specify radius; and
(d) A new fillet arc 100A is created.
(2) (a) Edit one or both of the filleted curves 102/104;
(b) The fillet arc 100A does not change.
(3) Erase the fillet arc 100A.
(4) (a) Use "FILLET" command;
(b) Reselect the same curves 102 and 104;
(c) Specify radius; and
(d) A new fillet arc 100B is created.

Steps 2-4 may possibly need to be repeated multiple times. Accordingly, each time one of the existing curves 102 or 104 is edited, the fillet needs to be deleted and recreated.

FIG. 1B illustrates prior art fillet 100A that is not automatically recalculated when curve 104 of FIG. 1A is independently stretched from its prior end point 106A to its new location 106B. In addition, the apparent intersection of curves 102 and 104 is not utilized. Instead, the top of vertical curve 104 remains the same and the new endpoint 106B is used for the bottom of curve 104.

Some 2D drafting systems support constraints between geometric entities. Such systems allow creating fillets in 2D sketches using constraints that preserve the fillet arc when the curves are edited, but behave non-intuitively and ambiguously. For example, the fillet arc 100A can be defined by tangency constraints between the fillet arc 100A and the to curves 102/104, a radial constraint, and coincidence constraints between the endpoints of the arc and the corresponding endpoints of the to curves 102/104. When any geometric entities 102/104 are edited, the drafting system invokes a constraint solver that automatically changes other geometric entities to satisfy the given constraints.

Defining a fillet 100A by constraints does not guarantee intuitive behavior when the filleted curves 102/104 or the fillet radius is edited. For instance, referring to FIG. 1C, when one curve 104 is edited by the user (i.e., by moving the endpoint 106A to location 106B), the constraint solver may decide to reposition the other curve 102 in order to satisfy the constraints instead of updating the fillet arc 100A. Or, when the fillet arc radius is edited, the constraint solver may decide to reposition the to curves 102/104 instead of repositioning the fillet arc 100A. When the endpoint 106A of the curve 104 is stretched to its new location 106B, as illustrated in FIG. 1C, a prior art constraint solver would likely decide to maintain the fillet arc center fixed as depicted by arc 108, which would not result in the desired behavior in most cases.

In view of the above, what is needed is a method that allows the fillet arcs to automatically update when the filleted curves or the fillet radius is edited. Such an automatic update further needs to behave intuitively and unambiguously.

SUMMARY OF THE INVENTION

To overcome the problems of the prior art, one or more embodiments of the invention provide for an associative framework that is utilized to provide an associative fillet action. This action within the associative framework utilizes two input curves to be filleted and can also include a fillet radius. The result of the evaluation of this action is a fillet arc that is tangent to the two input curves and trims or extends the input curves to the arc.

The fillet arc is associated with the two input curves such that if a property of either input curve is modified (or the radius of the fillet curve is modified), the fillet action is re-evaluated and the fillet curve is automatically and dynamically recalculated. Further, the input curves may be re-trimmed/re-extended to the fillet curve based on the recalculation.

BRIEF DESCRIPTION OF THE DRAWINGS

Referring now to the drawings in which like reference numbers represent corresponding parts throughout:

FIGS. 6A-6C illustrate the result of stretching of geometry when using the new associative fillet (FIG. 6B) and when using a prior art constraint solver (FIG. 6C) in accordance with embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A method, apparatus, and article of manufacture provide for the ability to associate a fillet arc with two geometric entities and automatically and dynamically update the fillet arc when one or more of the entities are modified/edited.

Hardware and Software Environment

Figure 2:
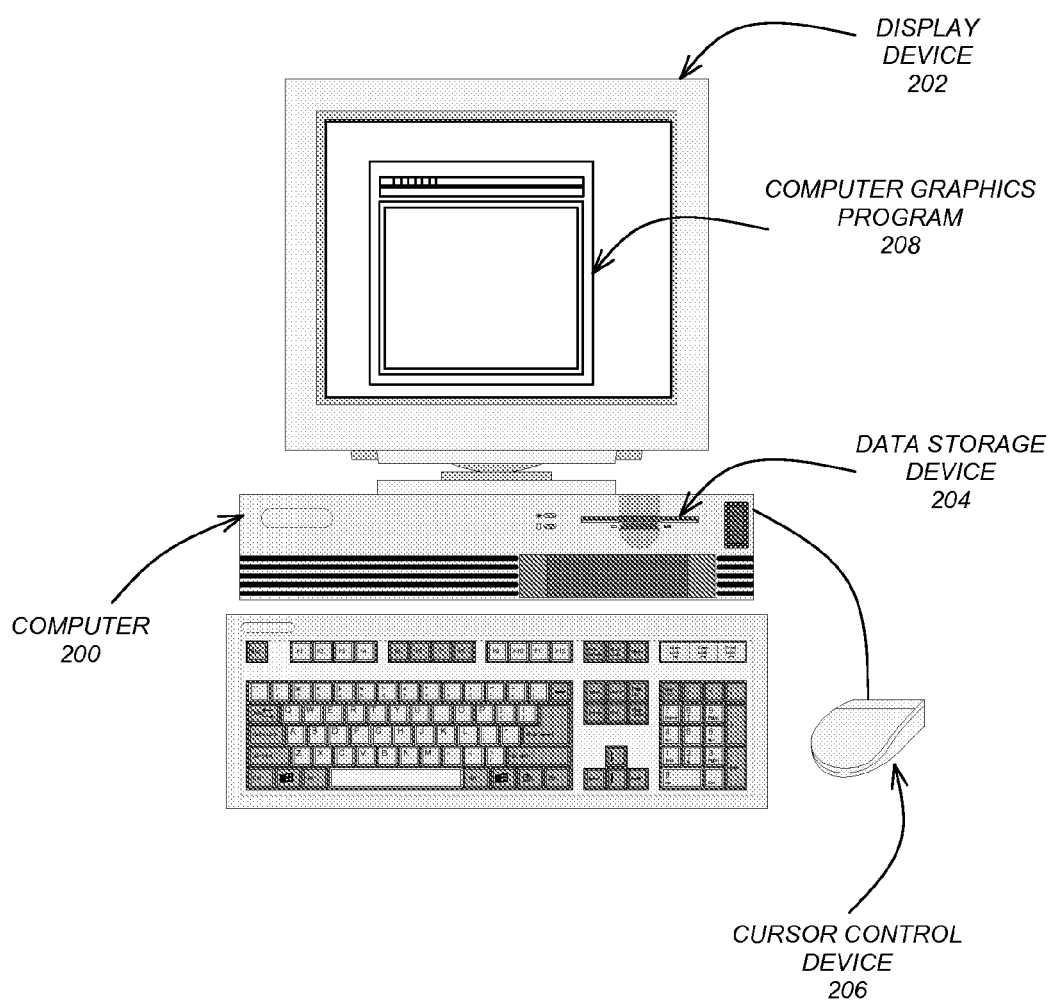
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200.

One or more embodiments of the invention are implemented by a computer-implemented graphics program 208, wherein the graphics program 208 is represented by a window displayed on the display device 202. Examples of such a computer graphics program 208 include a computer-aided design (CAD) application, a modeling application, 2D drafting programs, etc. Generally, the graphics program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

In one or more embodiments, instructions implementing the graphics program 208 are tangibly embodied in a computer-readable medium, e.g., data storage device 204, which could include one or more fixed or removable data storage devices, such as a zip drive, floppy disc drive, hard drive, CD-ROM drive, tape drive, etc. Further, the graphics program 208 is comprised of instructions which, when read and executed by the computer 200, causes the computer 200 to perform the steps necessary to implement and/or use the present invention. Graphics program 208 and/or operating instructions may also be tangibly embodied in a memory and/or data communications devices of computer 200, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 2 is not intended to limit the present invention. Indeed, those skilled in the art will recognize that other alternative environments may be used without departing from the scope of the present invention.

Computer-Implemented Graphics Program

Figure 3:
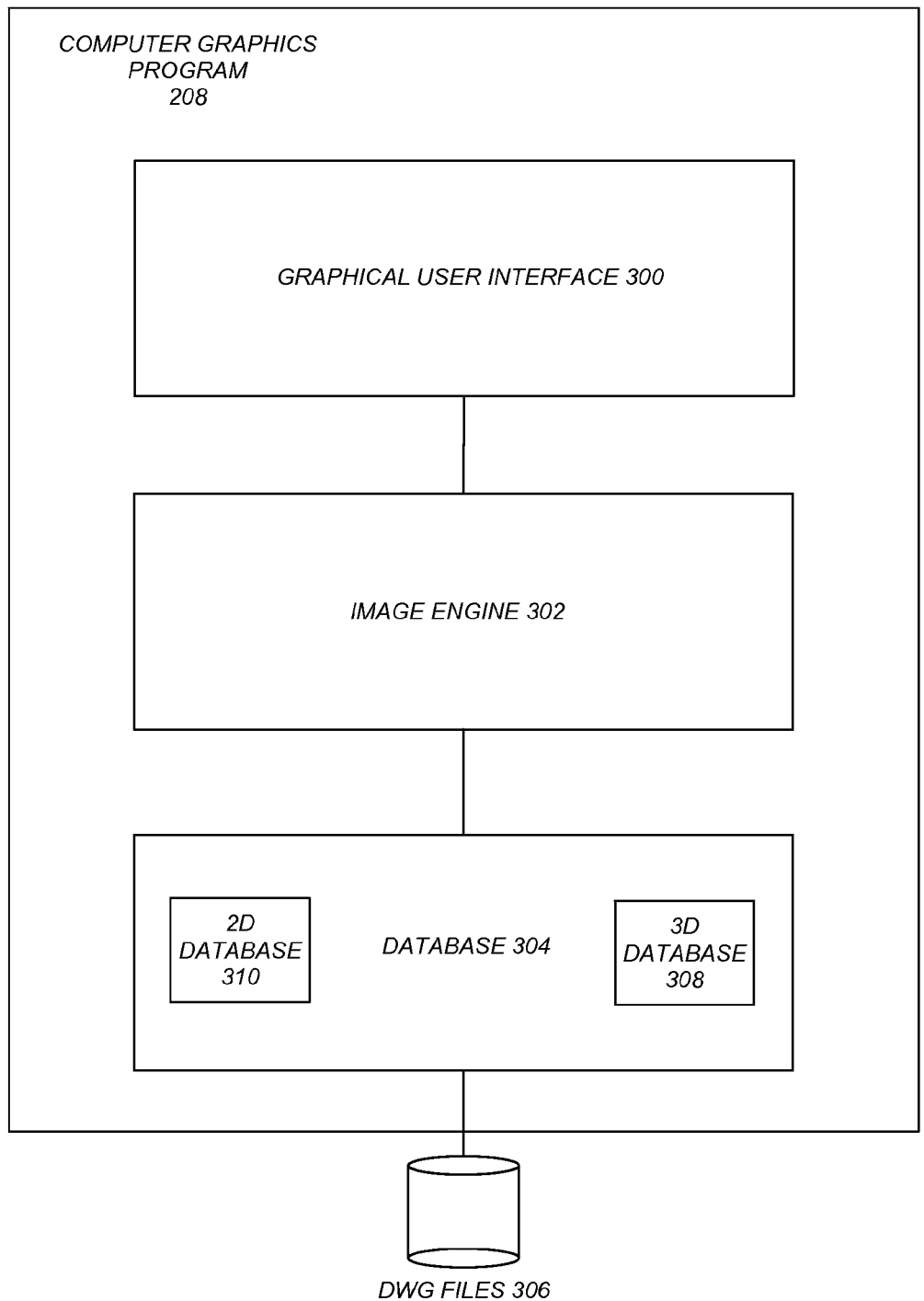
FIG. 3 is a block diagram that illustrates the components of a computer graphics program in accordance with one or more embodiments of the invention.

FIG. 3 is a block diagram that illustrates the components of the computer graphics program 208 in accordance with one or more embodiments of the invention. There are three main components to the graphics program 208, including: a Graphical User Interface (GUI) 300, an Image Engine (IME) 302, and a DataBase (DB) 304 for storing objects in Drawing (DWG) files 306.

The Graphical User Interface 300 displays information to the operator and provides the functionality for the operator's interaction with the graphics program 208.

The Image Engine 302 processes the DWG files 306 and delivers the resulting graphics to the monitor 202 for display. In one or more embodiments, the Image Engine 302 provides a complete application programming interface (API) that allows other computer programs to interface to the computer graphics program 208 as needed.

The Database 304 is comprised of two separate types of databases: (1) a 3D database 308 known as the "3D world space" that stores 3D information; and (2) one or more 2D databases 310 known as the "2D view ports" that stores 2D information derived from the 3D information.

Object List

Figure 4:
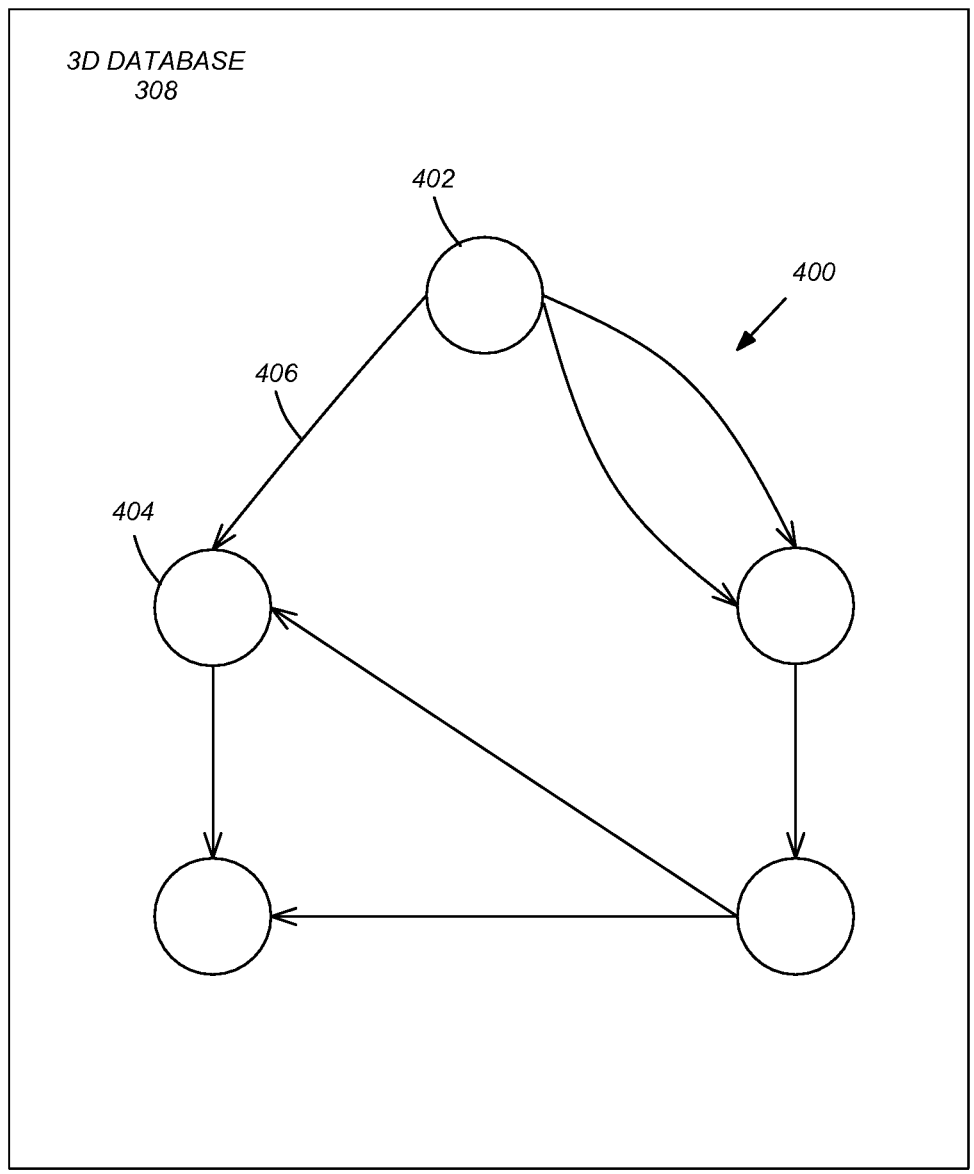
FIG. 4 is a block diagram that illustrates the structure of an object list in accordance with one or more embodiments of the invention.

FIG. 4 is a block diagram that illustrates the structure of an object list 400 maintained by the 3D databases 308 in accordance with one or more embodiments of the invention. The object list 400 is usually comprised of a doubly linked list having a list head 402 and one or more objects 404 interconnected by edges 406, although other structures may be used as well. There may be any number of different object lists 400 maintained by the 3D databases 308. Moreover, an object 404 may be a member of multiple object lists 400 in the 3D databases 308.

Operation of the Software Embodiment

Figure 5A:
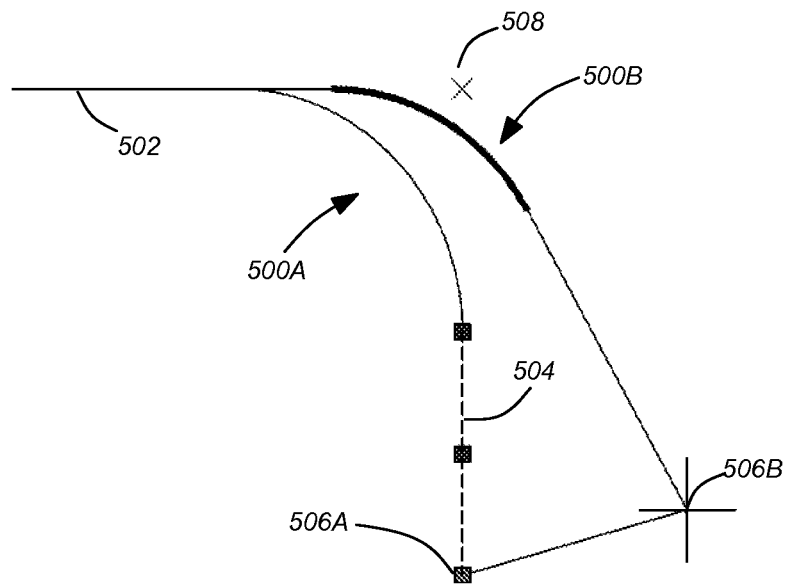
FIGS. 5A and 5B illustrate the use of an associative fillet in accordance with one or more embodiments of the invention.
Figure 5B:
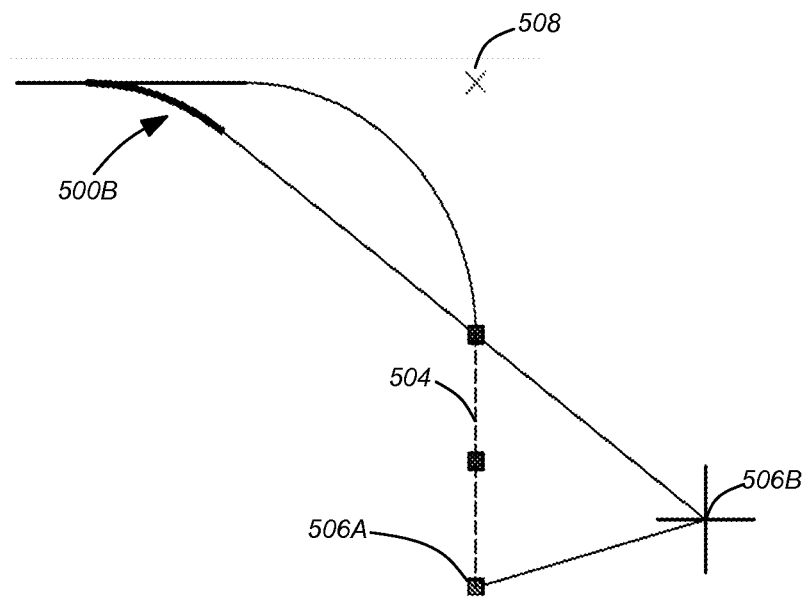

In one or more embodiments of the invention, the graphics program 208 provides for an associative fillet. FIGS. 5A and 5B illustrate the use of an associative fillet in accordance with one or more embodiments of the invention. In FIG. 5A, to create the associative fillet, an action takes as its input two curves (e.g., curves 502 and 504) to be filleted and the fillet radius. The action creates a fillet arc 500A tangent to the two input curves and trims or extends the input curves to the arc. It exhibits the following intuitive behaviors:

(1) When the user edits one or both filleted curves 502/504, or edits the fillet radius, the fillet arc 500A is automatically recalculated (into 500B) and the filleted curves 502/504 are re-trimmed/re-extended, but not repositioned. This is happening dynamically in real time.

(2) Explicitly repositioning of the fillet arc 500A is disabled. The fillet arc 500A is fully defined by the filleted curves 502/504 and by its radius. The fillet arc 500A does not show grips that control its position, only a grip that controls its radius.

Figures 1A, 1B, 1C:
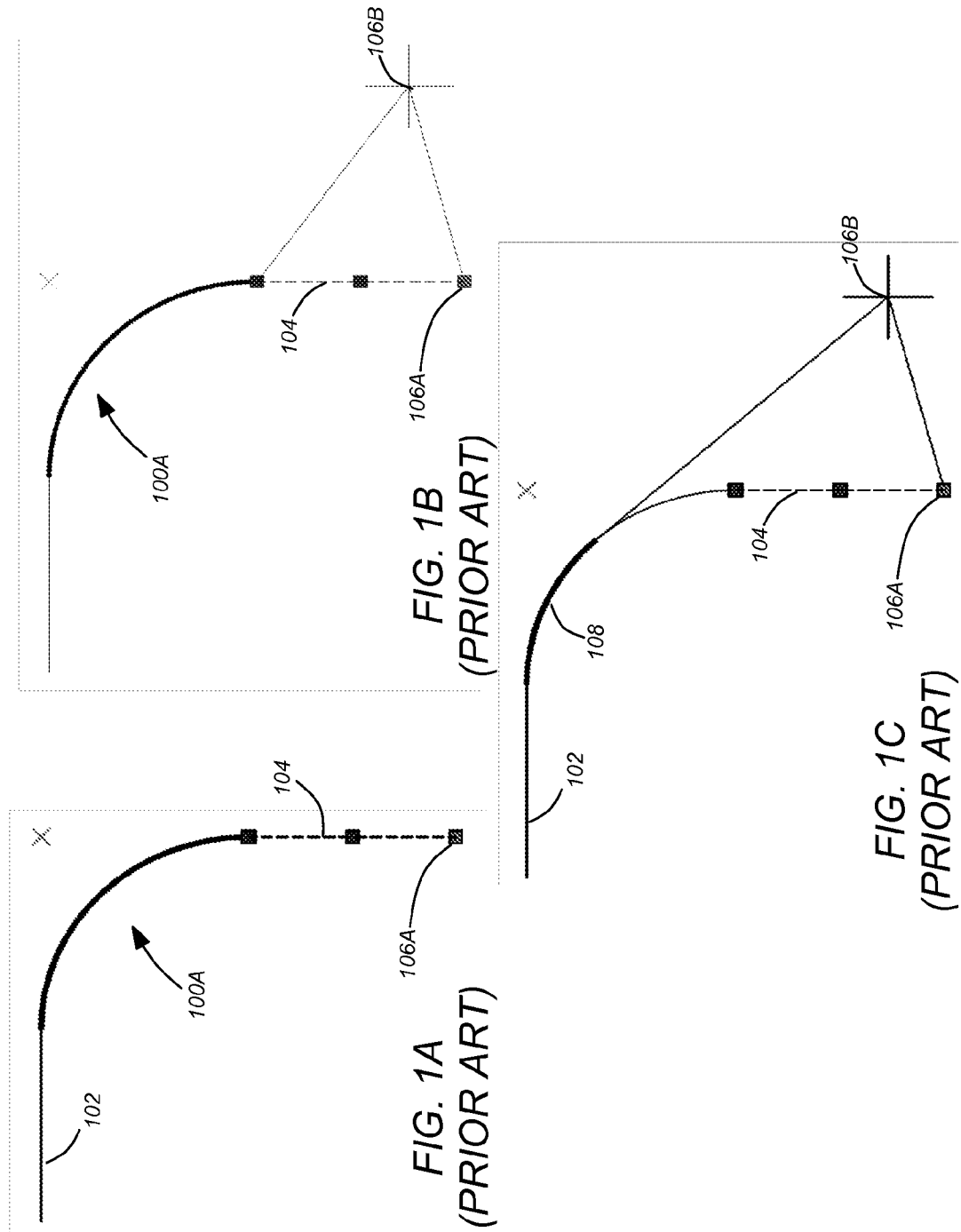
FIG. 1A illustrates a fillet created in accordance with the prior art.
FIG. 1B illustrates a prior art fillet that is not recalculated when a curve is independently stretched.
FIG. 1C illustrates a possible outcome if a prior art constraint solver is used to adjust a fillet arc.

When stretching one endpoint 506A of a curve 504 (i.e., to location 506B) that has an associative fillet 500A at the opposite end, the apparent intersection 508 of the two curves 502/504 is used as the base point for the stretch operation. The result provides intuitive behavior by forming fillet 500B, unlike if the curve 500A was stretched independently and then the fillet recalculated. In this regard, FIG. 5B illustrates the resulting behavior when the apparent intersection 508 is not utilized during the stretch operation (resulting in the filleted curve 500B behaving in a non-intuitive manner). If constraints were used to define the fillet 500A, the constraint solver would likely decide to keep the fillet arc center fixed, which would not be the desired behavior in most cases (i.e., as in FIG. 1C).

The stretching of geometry is useful to better understand how associative fillets are processed in accordance with the invention. FIGS. 6A-6C illustrate the result of stretching of geometry when the new associative fillet is applied (FIG. 6B) and when a prior art solution of using a constraint solver is applied (FIG. 6C). FIG. 6A illustrates the direction 602 the geometry 600 will be stretched. As illustrated in FIG. 6B, the associative fillets 604 and 606 behave intuitively in accordance with the invention because the associative fillet action recreates the fillet arcs 604/606 in the correct orientation and location relative to the filleted curves 600/608/610.

However, if constraints (as in the prior art) are used to define the fillet arcs 604/606, the fillets do not behave intuitively as illustrated in FIG. 6C, because the constraint solver treats the fillet arcs as ordinary arcs, not as fillets that have special behaviors. The result illustrated in FIG. 6B is possible because the associative fillet actions (i.e., the subject of the invention) remember the relative positions of the fillets 604/606 with respect to the filleted/input curves 608/600/610 and reuse this information every time they recalculate the fillet arcs 604/606.

Logic of the Graphics Program

Figure 7:
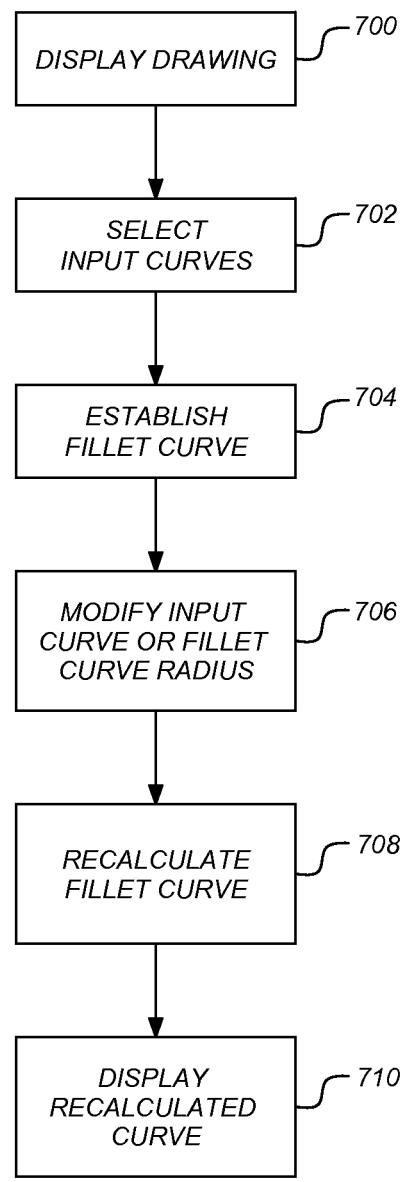
FIG. 7 is a flowchart illustrating the process for updating a filleted curve in accordance with one or more embodiments of the invention.

FIG. 7 is a flowchart illustrating the process for updating a filleted curve in accordance with one or more embodiments of the invention. At step 700, a computer-implemented drawing is displayed on a display device. The drawing contains a first input curve and a second input curve.

At step 702, the first input curve and the second input curve are selected. Such selection may be conducted by a user selecting the curves (e.g., via a cursor control device such as a mouse while clicking a mouse button on particular curves in the drawing or selecting curves from a list of curves [e.g., in a properties palette]). Further, such curves may be Bezier curves, lines, geometry, shapes, etc. in accordance with embodiments of the invention.

At step 704, a fillet curve is established. Such an establishing may consist of calculating, creating, and displaying the fillet curve between the first input curve and the second input curve. As described above, the fillet curve may comprise a fillet arc that is tangent to the first and second input curves. Further, the first and second input curves may be trimmed or extended to the fillet arc.

At step 706, a property of one or more of the input curves or the radius of the fillet curve is modified. For example, the endpoint of one of the input curves may be stretched. Alternatively, a selection of geometry (e.g., consisting of the two input curves and the fillet curve) may be stretched. A grip or icon on the fillet curve may also be used to modify the radius of the fillet curve. Such a modification of a property of the input curves or the radius of the fillet curve may be performed by the user via a mouse (or pen and tablet device) to drag a grip or point. Alternatively, the property(ies) may be modified in a properties palette by the user entering a new value for a property. Accordingly, embodiments of the invention may be utilized to both directly manipulate the input curves/radius or utilize a properties palette. While the direct manipulation and/or property palette are described herein, the invention is not limited to such practices and any method that can be used to modify a property of a curve/geometry may be used in accordance with the invention.

At step 708, the fillet curve is recalculated based on the modification to the property/radius. The recalculation is performed automatically (i.e., without additional user input) and may be performed dynamically in real time. For example, the fillet action in an associative framework may be used to create a fillet curve based on particular inputs (e.g., input curves and/or radius). The output from the fillet action is a fillet arc. Thus, each action is therefore associated with particular inputs. If the input changes (e.g., the property of the input curves or the radius of the fillet arc changes), the associative framework collects all the affected actions and re-evaluates them, which updates the outputs based on the changed inputs.

Within step 708, the input curves may be re-trimmed or re-extended to the fillet arc as a result of the recalculation. Further, during such actions, the first and second input curves may not be repositioned when the fillet curve is recalculated. In addition, an apparent intersection of the first input curve and second input curve may be used as the base point when the input curves are stretched. As used herein, an "apparent intersection" is defined as the extrapolated point resulting from unbinding two closed/bound curves and determining the resulting intersection of the two unbound curves. Such a use of a base point provides the ability for the fillet action to behave in a more user intuitive manner when endpoints of the first or of the second input curve are stretched. In addition, the relative position of the fillet curve with respect to the two input curves may be maintained when conducting the recalculating. For example, if the fillet curve provides a certain position with respect to the input curves (e.g., as illustrated in FIG. 6A), such a position may be maintained in the recalculation (e.g., see FIG. 6B). By maintaining the relative position between input curves and the fillet arc, non-intuitive behavior such as that illustrated in FIG. 6C can be avoided.

At step 710, the recalculated fillet curve is displayed.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for updating a filleted curve in a computer graphics application, comprising:
   (a) displaying a computer-implemented drawing on a display device of a computer, wherein the drawing comprises a first input curve and a second input curve;

(b) selecting the first input curve;
(c) selecting the second input curve;
(d) calculating, creating, and displaying a fillet curve between the first input curve and the second input curve;
(e) associating the fillet curve with the first input curve and the second input curve;
(f) determining and remembering a relative position of the fillet curve with respect to the first input curve and the second input curve;
(g) modifying a property of the first input curve;
(h) in response to the modifying, automatically, without additional user input, and based on the associating and using the remembered relative position, recalculating the fillet curve based on the modified property, wherein the remembered relative position of the fillet curve with respect to the first input curve and the second input curve is maintained before and after the recalculating; and
(i) displaying the recalculated fillet curve.

2. The method of claim 1 wherein the selecting of the first input curve and the selecting of the second input curve comprise accepting user input selecting the first input curve and the second input curve.

3. The method of claim 1, wherein the fillet curve comprises a fillet arc tangent to the first input curve and the second input curve, wherein the first input curve and the second input curve are trimmed or extended to the fillet arc.

4. The method of claim 3, wherein the recalculating comprises re-trimming or re-extending the first input curve and the second input curve to the recalculated fillet curve.

5. The method of claim 4 wherein the first and the second input curves are not repositioned when the fillet curve is recalculated.

6. The method of claim 1 wherein:
the modifying comprises conducting a stretch operation by modifying an endpoint of the first input curve; and
an apparent intersection of the first input curve and the second input curve is used as a base point when performing the stretch modification operation on the endpoint of the first curve.

7. The method of claim 1 wherein:
the modifying comprises conducting a stretch operation by stretching a geometry comprising the first input curve, the second input curve, and the fillet curve; and
the relative position of the fillet curve with respect to the first input curve and the second input curve is maintained when conducting the recalculating.

8. The method of claim 1, wherein the associating comprises:
providing an associative framework;
within the associative framework, evaluating an action to create the fillet curve; and
within the associative framework, as a result of the evaluating, creating the fillet curve that is associated with the first input curve and the second input curve.

9. The method of claim 8, wherein:
the modifying of the property is detected by the associative framework dynamically in real-time; and
the associative framework, automatically, without additional user input, in response to the detected modifying, and based on the associating, recalculates the fillet curve dynamically in real-time, and displays the recalculated fillet curve dynamically in real-time.

10. The method of claim 1, wherein the first input curve and/or the second input curve comprise a Bezier curve.

11. The method of claim 1, further comprising:
determining an orientation of the fillet curve relative to the first input curve and the second input curve; and
wherein the recalculating maintains the orientation in an intuitive behavioral manner.

12. A computer-implemented system comprising:
(a) a computer having a memory and a display device;
(b) a graphics application executing on the computer, wherein the graphics application is configured to:
(i) display a computer-implemented drawing on the display device, wherein the drawing comprises a first input curve and a second input curve;
(ii) select the first input curve;
(iii) select the second input curve;
(iv) calculate, create, and display a fillet curve between the first input curve and the second input curve;
(v) associate the fillet curve with the first input curve and the second input curve;
(vi) determine and remember a relative position of the fillet curve with respect to the first input curve and the second input curve;
(vii) modify a property of the first input curve;
(viii) in response to the modify, automatically, without additional user input, and based on the fillet curve association with the first input curve and the second input curve, and using the remembered relative position, recalculate the fillet curve based on the modified property, wherein the remembered relative position of the fillet curve with respect to the first input curve and the second input curve is maintained before and after the recalculating; and
(ix) display the recalculated fillet curve on the display device.

13. The system of claim 12 wherein the application is configured to select the first input curve and select the second input curve by accepting user input selecting the first input curve and the second input curve.

14. The system of claim 12, wherein the fillet curve comprises a fillet arc tangent to the first input curve and the second input curve, wherein the first input curve and the second input curve are trimmed or extended to the fillet arc.

15. The system of claim 14, wherein the application is configured to recalculate by re-trimming or re-extending the first input curve and the second input curve to the recalculated fillet curve.

16. The system of claim 15 wherein the first and the second input curves are not repositioned when the fillet curve is recalculated.

17. The system of claim 12 wherein:
the application is configured to modify by conducting a stretch operation by modifying an endpoint of the first input curve; and
an apparent intersection of the first input curve and the second input curve is used as a base point when performing the stretch modification operation on the endpoint of the first input curve.

18. The system of claim 12 wherein:
the application is configured to modify by conducting a stretch operation by stretching a geometry comprising the first input curve, the second input curve, and the fillet curve; and
the relative position of the fillet curve with respect to the first input curve and the second input curve is maintained when conducting the recalculating.

19. The system of claim 12 wherein the application is further configured to:
modify a radius of the fillet curve;
automatically, without additional user input, recalculate the fillet curve based on the modified radius; and
display the recalculated fillet curve.

20. An article of manufacture comprising a program storage device, readable by a computer, tangibly embodying at least one program of instructions executable by the computer to perform method steps for updating a filleted curve in a computer graphics application, the method steps comprising the steps of:
   (a) displaying a computer-implemented drawing on a display device of a computer, wherein the drawing comprises a first input curve and a second input curve;
   (b) selecting the first input curve;
   (c) selecting the second input curve;
   (d) calculating, creating, and displaying a fillet curve between the first input curve and the second input curve;
   (e) associating the fillet curve with the first input curve and the second input curve;
   (f) determining and remembering a relative position of the fillet curve with respect to the first input curve and the second input curve;
   (g) modifying a property of the first input curve;
   (h) in response to the modifying, automatically, without additional user input, and based on the associating and using the remembered relative position, recalculating the fillet curve based on the modified property, wherein the remembered relative position of the fillet curve with respect to the first input curve and the second input curve is maintained before and after the recalculating; and
   (i) displaying the recalculated fillet curve.

* * * * *